(12) United States Patent
Jansen

(10) Patent No.: US 7,369,812 B2
(45) Date of Patent: May 6, 2008

(54) METHOD AND CIRCUIT ARRANGEMENT FOR DETERMINING THE SIGNAL STRENGTH IN RECEIVERS WITH COMPLEX SIGNAL PROCESSING

(75) Inventor: Winfried Jansen, Tornesch (DE)

(73) Assignee: NXP B.V., Eindhoven (NL)

( * ) Notice: Subject to any disclaimer, the term of this patent is extended or adjusted under 35 U.S.C. 154(b) by 5 days.

(21) Appl. No.: 10/541,883

(22) PCT Filed: Dec. 15, 2003

(86) PCT No.: PCT/IB03/06036

§ 371 (c)(1),
(2), (4) Date: Mar. 27, 2006

(87) PCT Pub. No.: WO2004/062142

PCT Pub. Date: Jul. 22, 2004

(65) Prior Publication Data

US 2006/0148409 A1    Jul. 6, 2006

(30) Foreign Application Priority Data

Jan. 7, 2003   (EP) .................................. 03100007

(51) Int. Cl.
*H04B 17/00* (2006.01)
(52) U.S. Cl. ................................ 455/67.11; 455/115.3; 455/226.2

(58) Field of Classification Search ............ 455/115.1, 455/115.3, 67.11, 226.2, 226.1; 375/302, 375/322
See application file for complete search history.

(56) References Cited

U.S. PATENT DOCUMENTS

| 4,972,512 A | * | 11/1990 | Garskamp | .................. 455/341 |
| 5,627,857 A | * | 5/1997 | Wilson | ....................... 375/219 |
| 5,790,943 A | * | 8/1998 | Fotowat-Ahmady et al. | .... 455/226.2 |
| 6,417,737 B1 | * | 7/2002 | Moloudi et al. | ............ 330/301 |
| 6,442,380 B1 | * | 8/2002 | Mohindra | ................ 455/234.1 |
| 6,721,548 B1 | * | 4/2004 | Mohindra et al. | ........ 455/234.1 |
| 2003/0181179 A1 | * | 9/2003 | Darabi | .................... 455/234.1 |

FOREIGN PATENT DOCUMENTS

WO    WO 01 47154    6/2001

* cited by examiner

Primary Examiner—Quochien B. Vuong

(57) ABSTRACT

In order to provide a method of determining the signal strength in a receiver or transmitter with complex signal processing using the in-phase channel (I channel) and the quadrature channel (Q channel), by means of which it is also possible to reliably determine the signal strength in receivers with a low intermediate frequency, it is proposed that the field strength signals of the I channel and of the Q channel are fed to an evaluation unit and that, in the evaluation unit, an overall field strength signal is generated on a logarithmic scale without intermediate frequency residues from the individual field strength signals.

5 Claims, 2 Drawing Sheets

METHOD AND CIRCUIT ARRANGEMENT FOR DETERMINING THE SIGNAL STRENGTH IN RECEIVERS WITH COMPLEX SIGNAL PROCESSING

The invention relates to a method and a circuit arrangement for determining the signal strength in a receiver or transmitter with complex signal processing using the in-phase channel and the quadrature channel.

In the case of analog or what is known as "mixed signal" signal processing, in receivers or transmitters that are conventional today, complex signal processing using the in-phase channel (I channel) and the quadrature channel (Q channel) is almost exclusively used. Typically, a complex mixer breaks an incoming signal down into two parallel signals, the I signal and the Q signal. The I channel is in this case multiplied by cos ($\omega$t), while a multiplication by $-\sin$ ($\omega$t) is carried out on the Q channel. The two channels are then in quadrature to one another, that is to say they are orthogonal.

Examples of such systems with complex signal processing are, inter alia, DECT systems, GMS receivers, pagers and also AM and FM receivers. Such systems require the signal strength (or RSSI, Received Signal Strength Indication) for various purposes. For instance, in mobile telephones and in cordless telephones the transmission power is controlled by the received field strength. In modern car radios, too, many functions are controlled via the received field strength, such as the changeover from mono to stereo sound, the treble, automatic control of the amplification or the suppression of interference pulses.

Known methods of determining the signal strength use the logarithmic field strength information from the limiter amplifier of the intermediate frequency part. Here, a small part of the logarithmic characteristic is obtained from each stage of the multistage limiter amplifier and these parts are summed. This gives a transfer function of the form f(vin)=vt Log (vin/vt).

However, the signal thus obtained is not continuous and contains high portions of the intermediate frequency and harmonics thereof, which have to be sieved out by low-pass filters. This problem does not occur in receivers with a high intermediate frequency, since the bandwidth of the signal obtained is still sufficiently high even after the intermediate frequency portions have been filtered out.

However, in more modern receivers with a low intermediate frequency this filtering out which is necessary in this procedure proves to be problematic, since the bandwidth of a field strength signal generated in this way is no longer sufficient. However, without filtering, the field strength signal contains too high portions of the intermediate frequency and harmonics thereof. This is still true even for the sum of the two signals.

It is therefore an object of the invention to provide an improved method of the type mentioned above, by means of which it is also possible to reliably determine the signal strength even in receivers with a low intermediate frequency.

This object is achieved by the method having the method steps specified in the claims and by the circuit arrangement having the features specified in the claims.

The invention accordingly provides that, in a method of determining the signal strength in a receiver or transmitter with complex signal processing using the I channel and the Q channel, the field strength signals of the I channel and of the Q channel are fed to an evaluation unit and, in the evaluation unit, an overall field strength signal is generated on a logarithmic scale without intermediate frequency residues from the individual field strength signals.

The method according to the invention has the advantage that the bandwidth of the field strength signal thus obtained is in principle unlimited. Therefore, the evaluation of the field strength information can be improved or the filtering effort required can be considerably reduced for the same quality of the field strength information. The bandwidth may even be higher than the intermediate frequency itself, something which is fundamentally not possible using conventional approaches.

Advantageous refinements and developments of the invention are characterized in the claims.

Preferably, according to the development of the invention as claimed in the claims, it is provided that the overall field strength signal is generated in the evaluation unit in accordance with the relation $$\text{FieldSt} = \ln(e^{2I\_\log} + e^{2Q\_\log}) \qquad (1),$$

where FieldSt is the overall field strength signal and I_log and Q_log are the field strength signals of the I channel and of the Q channel, respectively. By means of this mathematical equation, the overall field strength signal can in principle be determined exactly from the individual field strength signals.

According to the preferred refinement as claimed in the claims, it is provided that the field strength signals of the I channel and of the Q channel are fed to the evaluation unit without amplification.

Alternatively, according to the measure of the claims, the field strength signals of the I channel and of the Q channel are expediently amplified before they are fed to the evaluation unit.

In a circuit arrangement of the type mentioned above, an evaluation unit is characteristically provided which has two inputs for the field strength signals of the I channel and of the Q channel and which generates an overall field strength signal on a logarithmic scale without intermediate frequency residues from the individual field strength signals, in order to output it at an output of the evaluation unit.

According to the expedient refinement of the invention as claimed in the claims, it is provided that the evaluation unit generates the overall field strength signal in accordance with mathematical relation (1) given above.

According to the advantageous development of the invention as claimed in the claims, the evaluation unit contains in each case one diode for the I channel and the Q channel, where the anodes of the diodes are in each case connected to the inputs for the field strength signals of the I channel and of the Q channel and the cathodes of the diodes are connected to one another, to a current source and to the output of the evaluation unit.

The invention will be further described with reference to examples of embodiments shown in the drawings to which, however, the invention is not restricted.

Figure 1:
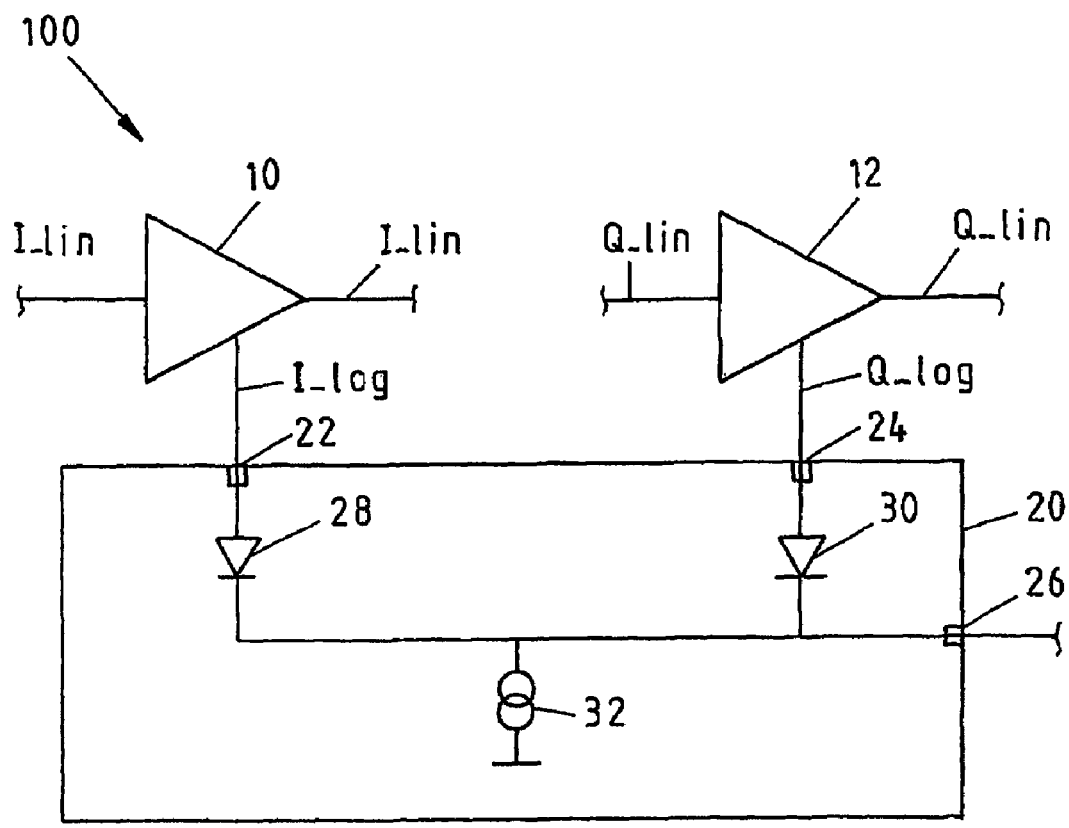
FIG. 1 shows a schematic diagram of a circuit arrangement having an evaluation unit according to one example of embodiment of the invention.

FIG. 1 shows a circuit arrangement 100 having an evaluation unit 20 according to one example of embodiment of the invention in the form of a schematic diagram. Besides the evaluation unit 20, an amplifier stage 10 for the I channel and an amplifier stage 12 for the Q channel are also shown in the circuit arrangement 100. The evaluation unit 20 has two inputs 22, 24, to which the outputs I_log and Q_log of the amplifier stages 10 and 12 are respectively fed.

In the evaluation unit 20, the inputs 22 and 24 are respectively connected to the anode of an I channel diode 28 and of a Q channel diode 30. The cathodes of the two diodes 28 and 30 are connected to one another, to a current source 32 and to an output 26 of the evaluation unit.

If the I channel is given by I_log=2vt ln(I_lin) and the Q channel is given by Q_log=2vt ln(Q_lin), this results, in the circuit arrangement shown, in an output signal FieldSt at the output 26 which is given by the relation FieldSt=ln($e^2$I_log+$e^2$Q_log)

Figure 2:
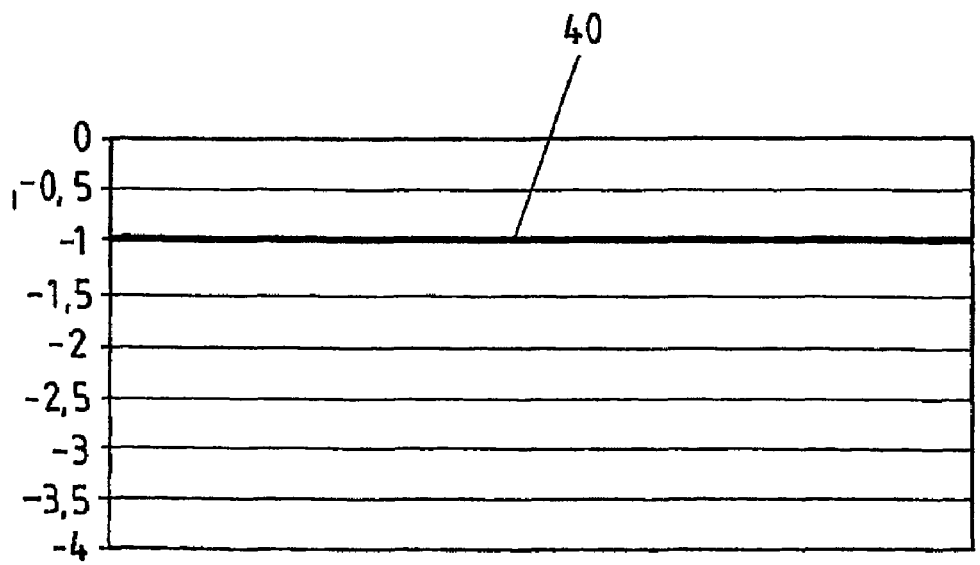
FIG. 2 shows a diagram depicting the overall field strength signal determined according to one example of embodiment of the method according to the invention.

The logarithmic overall field strength signal FieldSt in this case does not contain any intermediate frequency residues, as can be seen in the representation of the signal by the curve 40 in FIG. 2. The bandwidth of the signal thus obtained is in principle unlimited.

Figure 3:
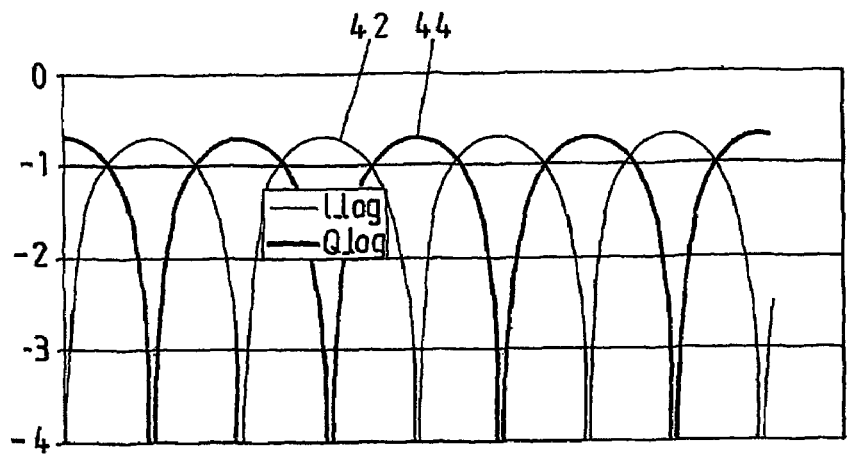
FIGS. 3 and 4 show diagrams depicting the field strength signals of I channel and Q channel determined according to a conventional method, and also the sum signal.
Figure 4:
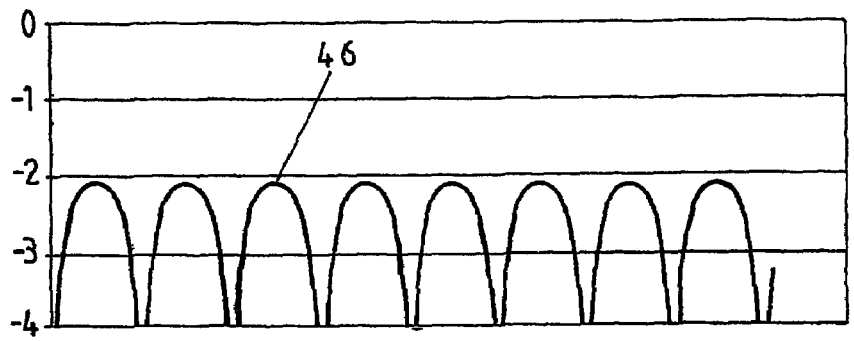

For comparison purposes, FIG. 3 shows the field strength signal I_log (reference 42) and Q_log (reference 44) in a conventional receiver. It can clearly be seen that the two signals in each case contain a large portion of the intermediate frequency and harmonics thereof. This is true even for the sum signal 46 shown in FIG. 4, which sum signal is formed by Sum_log=I_log+Q_log.

Figure 5:
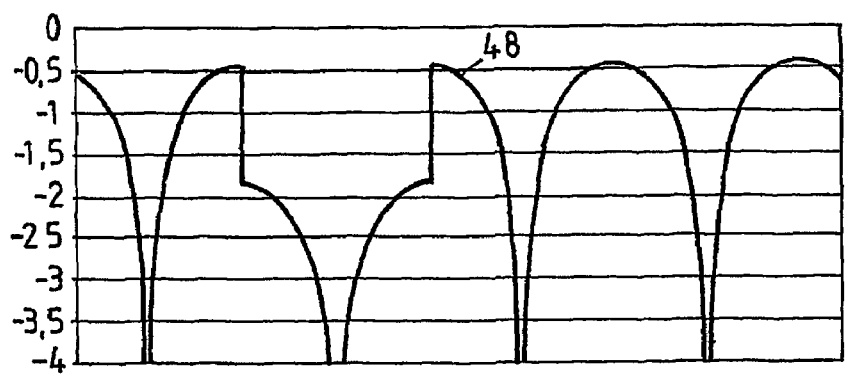
FIG. 5 shows a diagram depicting the reaction of a field strength signal, determined according to a conventional method, to an amplitude trough.
Figure 6:
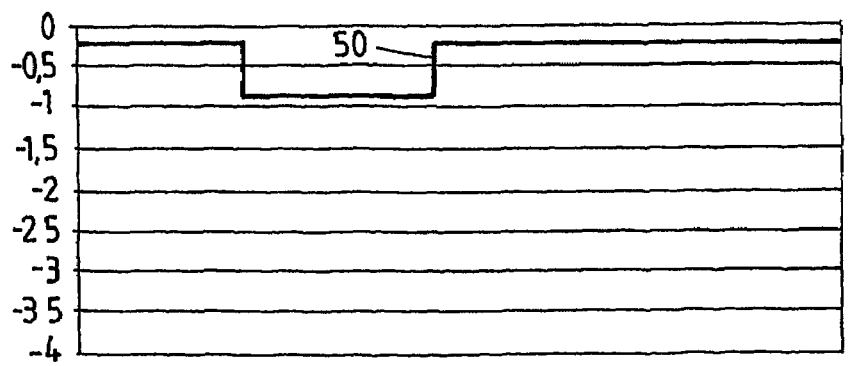
FIG. 6 shows a diagram depicting the reaction of an overall field strength signal, determined according to one example of embodiment of the method according to the invention, to an amplitude trough.

FIGS. 5 and 6 show, for comparison purposes, the reaction of a conventional field strength signal and the reaction of an overall field strength signal determined by the circuit arrangement 100 to an amplitude trough. The curve profile 48 in FIG. 5 shows the reaction of the conventionally determined field strength signal and the curve profile 50 in FIG. 6 shows the trough in the case of the overall field strength signal FieldSt determined according to the invention. The latter shows a practically ideal profile.

Since the bandwidth of the overall field strength signal does not need to be limited, there is no longer any additional delay for control loops, such as in the case of AGC (Automatic Gain Control), unlike in conventional systems.

It is even possible to produce rapid controlled amplifiers which control the vector formed from I signal and Q signal rather than the I and Q signals themselves. In systems with a low frequency, the evaluation of relatively high frequencies becomes possible for the first time using the described approach. In addition, the AM demodulation according to the Garskamp detector principle described in the document EP 0 331 234 B1 is considerably improved by the solution according to the invention, since it is no longer necessary to filter out the harmonics of the intermediate frequency.

While the invention has been illustrated and described in particular with reference to preferred examples of embodiment, it will be understood by the person skilled in the art that changes may be made to the configuration and details without departing from the idea and scope of the invention. Accordingly, the disclosure of the present invention is not intended to be limiting in nature. Rather, the disclosure of the present invention is intended to illustrate the scope of the invention which is expounded in the following claims.

LIST OF REFERENCES

10 amplifier stage for the I channel
12 amplifier stage for the Q channel
20 evaluation unit
22, 24 inputs
26 output
28 I channel diode
30 Q channel diode
32 current source
40-50 signal curves
100 circuit arrangement

The invention claimed is:

1. A method of determining the signal strength in a receiver or transmitter with complex signal processing using the in-phase channel (I channel) and the quadrature channel (Q channel), wherein the field strength signals of the I channel and of the Q channel are fed to an evaluation unit, and the overall field strength signal is generated in the evaluation unit in accordance with the relation FieldSt=ln ($e^2$I_log+$e^2$Q_log), where FieldSt is the overall field strength signal and I log and Q log are the field strength signals of the I channel and of the Q channel, respectively.

2. A method as claimed in claim 1, wherein the field strength signals of the I channel and of the Q channel are fed to the evaluation unit without amplification.

3. A method as claimed in claim 1, wherein the field strength signals of the I channel and of the Q channel are amplified before they are fed to the evaluation unit.

4. A circuit arrangement for determining the signal strength in a receiver or transmitter with complex signal processing using the in-phase channel (I channel) and the quadrature channel (Q channel), wherein an evaluation unit is provided, which has two inputs for the field strength signals (I_log, Q_log) of the I channel and of the Q channel and which generates an overall field strength signal (FieldSt) on a logarithmic scale, the evaluation unit comprising one diode for the I channel and one diode for the Q channel, where the anodes of the diodes are in each case connected to the inputs for the field strength signals of the I channel and of the Q channel and the cathodes of the diodes are connected to one another, to a current source and to the output of the evaluation unit.

5. A circuit arrangement as claimed in claim 4, characterized in that the evaluation unit generates the overall field strength signal (FieldSt) in accordance with the relation FieldSt=ln($e^2$I_log+$e^2$Q_log).

* * * * *